Patented Feb. 4, 1947

2,415,382

UNITED STATES PATENT OFFICE 2,415,382

PHOTOGRAPHIC ELEMENTS INCLUDING HYDROPHILIC COLOR FORMERS

David W. Woodward, Wilmington, Del., assignor to E. I. du Pont de Nemours & Company, Wilmington, Del., a corporation of Delaware No Drawing. Application March 31, 1944, Serial No. 528,947

6 Claims. (Cl. 95—7)

This invention relates to color photography, more particularly, it relates to novel hydrophilic color-yielding compositions, layers and elements and to processes of producing colored images therefrom.

An object of this invention is to provide a new class of color-yielding compositions. A further object is to provide color-yielding layers free from protein derivatives. Another object is to provide photographic elements having hydrophilic layers composed of dye intermediates capable of color-coupling and dye formation. Another object is to provide light-sensitive layers which contain a minimum number of component materials. Another object is to provide thin light-sensitive color-yielding layers which form images having good definition and high contrast. Another object is to provide such compositions and articles from readily available materials. Yet another object is to provide a new class of multilayer photographic elements of a high sensitivity for use in color-coupling development processes which will yield a high color density per molecule of silver salt reduced or developed and faithfully reproduce scenes in their natural colors, with complete clarity and good definition. Still other objects are to provide new materials for use in the field of color photography and to advance that art.

It has been found that good light-sensitive hydrophilic color-yielding compositions can be made from hydrophilic ethers of dye intermediates with cellulose derivatives which are hot water-soluble or soluble in water-organic solvent mixtures by incorporating light-sensitive silver salts, e. g., halides, therein. The resulting compositions can be coated from solution onto a support in the form of thin layers. The coating compositions used in making the elements may advantageously be prepared by precipitating silver halides in the aforesaid hydrophilic ethers by admixture of a soluble silver salt and soluble halide to a solution of such ethers. The resulting compositions, when coated, form homogeneous supported films which act both as a binding and dispersing agent for light-sensitive silver halides. Photographic elements so produced have many extremely useful characteristics and yield excellent dye images upon exposure to an image and color-coupling development.

The hydrophilic dye intermediate ethers of this invention may be further characterized as dye intermediate-substituted alkyl ethers of hydrophilic or water-soluble cellulose derivatives which contain a plurality of free hydroxyl groups. Such cellulosic ethers contain ether groups attached through an alkane hydrocarbon group to a dye intermediate nucleus. In such products, the dye intermediate nuclei form an integral part of the cellulose polymer which distinguishes them from physical mixtures of dye intermediates and colloid materials. It has been found that dye intermediates containing substituted halomethyl groups may be employed in making the dye intermediate ethers hereof. Other methods utilize aldehydes, e. g., acetaldehyde, benzaldehyde, materials which release formaldehyde, and methylol derivatives of the dye intermediates for connecting the dye intermediate nuclei to the cellulose nucleus through an ether oxygen linkage. The dye intermediate components are added in such an amount that a plurality of color-forming ether groups are present in each molecule of the final hydrophilic dye intermediate.

Cellulose derivatives useful in preparing these new hydrophilic ethers of dye intermediates include the partial esters and ethers of cellulose which are soluble in water and water-ethanol mixtures containing 10% to 90% of the latter. Among such compounds may be mentioned the derivatives in which 0.5 to 1.5 methyl-, ethyl-, hydroxyethyl-, carboxymethyl ether; acetate, propionate, acid phthalate, hydroxy acetate, etc., groups are present for each glucose unit. All of the cellulose derivatives useful in preparing the color-forming ethers of this invention have the group —CH$_2$OH or >CHOH representing between 12 and 44% by weight of the cellulose derivatives, i. e., there are at least 1.5 but not more than 2.5 of such hydroxyl-containing groups for each glucose unit. Further, it is preferred that the final dye intermediate or color-forming derivative have at least one and preferably at least 1.5 hydroxyl groups for each glucose unit and consist of between 10 and 24% by weight of the groups >CHOH and —CH$_2$OH so that they will have suitable permeability-solubility characteristics as described below. It is also preferred that between 0.03 and 1 color-forming group shall be present for each glucose unit. These useful cellulose derivatives, moreover, must be of high molecular weight (by this is meant having a polymer chain consisting of at least 20 glucose units and preferably more than 40 glucose units) in order that strong supported films may be formed. Thus, derivatives of such low molecular weight carbohydrates as sugars, starches, etc., are not useful in the present invention. In addition, the preferred hydrophilic dye intermediate ethers of cellulose derivatives have a high softening point when dry and are not dissolved by cold water (20° C.) but are soluble to the extent of at least 5 parts in 100 parts of warm (60° C.) water or a warm mixture of water containing less than 50% of a water-miscible organic solvent and preferably less than 25% of ethanol.

The above properties enable the resulting compositions to meet the rigorous physical demands required of the dispersing and binding agents used in preparing light-sensitive elements containing silver salts. The hydrophilic ethers of dye intermediates with cellulose derivatives hereof possess a unique combination of properties among which may be mentioned (1) ability to form a strong, coherent unsupported film, (2) ready permeability to water and photographic processing solutions at temperatures in the neighborhood of 20° C., (3) insolubility and freedom from softening in water at moderate temperatures, (4) ability to disperse, prevent coagulation and sedimentation of silver salts, (5) freedom from adverse action on sensitive silver salts, (6) a relatively high softening point, (7) transparency and freedom from color, (8) adequate solubility in satisfactory solvents for coating.

The hydrophilic polymeric dye intermediate ethers of the present invention combine not only the above properties but, in addition, function as chromogens. In fact, the number of color-coupling groups in the polymer can be controlled so as to contribute not only adequate color-forming capacity but also a portion of the desired solubility-permeability balance required for a satisfactory carrier for the light-sensitive material.

The degree of solubility required for preparing the dispersions and coating is readily attained with the cellulose derivatives of the type used in the present invention, as many of these are quite water-soluble, e. g., hydroxyethyl cellulose and methyl cellulose. The introduction of the dye intermediate ether groups in controlled amounts reduces the water solubility slightly to a point where the coated films, though still highly water-permeable are no longer soluble in cold water, photographic processing solutions, e. g., developers, fixing baths, etc., but are hydrophilic.

The term "hydrophilic" as used in this application and claims, when referring to the dye intermediate, etc., is intended to denote compounds which in the form of thin layers, e. g., one to ten microns in thickness, are insoluble in water at 20° C. but are freely water-permeable.

It is often satisfactory merely to balance the dye intermediate ether groups and hydroxyl groups in the correct ratio to secure the ideal permeability and film properties. Since different dye intermediate nuclei have different effects on solubility, this ratio will vary somewhat in the different products. If in any hydrophilic ether the dye intermediate substitution which gives the optimum color on chromogenic development does not yield the desired solubility, this can easily be corrected by the introduction of other groups such as ether, or ester groups designed to give the desired solubilizing or insolubilizing effect. For instance, acetylation of free hydroxyl groups decreases water solubility, while etherification with glycolic acid increases water solubility.

The dye intermediate ethers consist of single compounds having two chemically connected components (1) dye intermediate nuclei and (2) cellulosic components, each dye intermediate nucleus being linked through an ether oxygen atom to the cellulose derivative. Each molecule of the cellulose derivative thus has a plurality of dye intermediate nuclei as an integral part of its structure.

By dye intermediates or color-formers are meant nuclei containing groups which are capable of coupling with the oxidation products of color coupling aromatic primary amino developing agents formed on development of silver salts images to form a quinoneimine (including indamine, indoaniline and indophenol) dye or an azomethine dye. These dye intermediate nuclei are also capable of coupling with diazotized aromatic amines to form azo dyes.

Nuclei of the above type are well known in the dye art and color photography art. They are sometimes called color-formers, coupling components, etc.

These dye intermediate nuclei have as the active coupling groups a structure which may be represented as

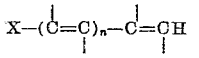

where X is HO— or RHN where R is H or a saturated aliphatic group, e. g., methyl, ethyl, beta-hydroxyethyl, beta-chlorethyl, benzyl, dodecyl, etc., and $n$ is 0 or 1. This group is found in the reactive methylene dye intermediates and in aromatic hydroxyl and amino compounds and includes the reactive ethenol, aminoethenyl, 4-hydroxy- and 4-amino-1,3-butadienyl groups. These groups occur in phenols, naphthols, anilines, naphthylamines, acylacetamides, cyanoacetamides, beta-keto-esters, pyrazolones, homophthalimides, coumaranones, indoxyls, thioindoxyls, etc.

The reactive ethenol group represented by

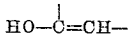

occurs in phenols and naphthols which couple in the ortho position and in the alkali soluble or enol form of most reactive methylene dye intermediates. These reactive methylene groups have a hydrogen rendered mobile by the proximity of certain unsaturated groups such as for example $$-\overset{|}{C}=O, \quad -C\equiv N-, \quad -\overset{|}{C}=N-$$

and others. The —CH₂— group is usually present between two such groups, for example

in a cyclic or acyclic system.

The reactive aminoethenyl group

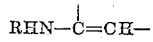

occurs in aromatic amino compounds which couple in the ortho position.

The 4-hydroxy- and 4-amino-1,3-butadienyl groups represented as

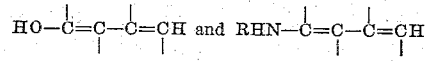

occur in phenolic, naphtholic and aromatic amino compounds which couple in the para position.

In all of these dye intermediate groups the hydrogen atoms in the coupling reactive position may be replaced by groups readily eliminated in the coupling reaction, e. g., halogen, sulfonic acid, carboxylic acid, etc.

In a preferred method of preparation of the hydrophilic color-forming binding agents a cellulose derivative represented by the formula:

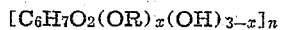

in which $x$ is 0.5 to 1.5, $n$ is at least 40 and R is an alkyl radical of 1 to 3 carbon atoms or a fatty acid radical of 2 to 3 carbon atoms or one of the above containing a hydroxyl or carboxylic acid group, is linked to a dye intermediate nucleus "Q" by a formaldehyde-yielding material to yield a hydrophilic dye intermediate of the formula:

$$[C_6H_7O_2(OR)_x(OCH_2Q)_y(OH)_{3-(x+y)}]_n$$

wherein $x$ is 0.5 to 1.5, $y$ is 0.03 to 1.0 but the total of $x$ and $y$ is not more than 2, and Q is a dye intermediate nucleus.

In the above formula, R may be methyl, ethyl, isopropyl, acetyl, propionyl, hydroxyethyl, carboxymethyl, o-carboxybenzoyl, carboxyethyl, etc., Q may be a phenol, naphthol, phenylamine, naphthylamine, acylacetamide, acylacetester, cyanoacetamide, pyrazolone, hydrindene, nitrobenzylcyanide, couramonone, N-homophthalylamine, etc., nucleus.

The aldehyde may be added to a solution or a suspension of the cellulose derivative and dye intermediate in the presence of a catalyst, or it may be condensed with a simple dye intermediate first to form a methylol compound which may in turn be condensed with the cellulose derivative; or alternatively the methylol derivative of the cellulose derivative can first be formed and condensed further with the color-forming compound. Suitable condensation catalysts include sulfuric acid, phosphoric acid, hydrochloric acid, etc.

Color-yielding photographic compositions can be made by dissolving the novel hydrophilic dye intermediate ethers of cellulose derivatives in a solvent, e. g., water, containing 25% or less of a water soluble solvent, e. g., methanol, ethanol. A water soluble inorganic halide is incorporated in the solution, and a solution of a water-soluble silver salt, e. g., silver nitrate, added. Silver halides are thereby precipitated in the hydrophilic dye intermediate solution. The resulting emulsions or dispersions can be further treated, e. g., ripened, coagulated, freed, from excess silver salts, precipitated, shredded, digested, etc., in a manner similar to silver halide-gelatin emulsions. The emulsions can be further modified in similar manners by adding optical sensitizing dyes, emulsion sensitizers, antifogging agents, preservatives, hardeners, and/or other emulsion constituents at any stage prior to coating, and then coated onto a suitable support, e. g., paper, metal, glass, a transparent cellulose derivative film or a synthetic resin, e. g., a polyvinyl acetal, or superpolymer film, e. g., nylon, or onto a colloid layer on such a support, e. g., a gelatin layer or similar hydrophilic dye intermediate layer. After drying, the resulting element can be exposed and processed in the same manner as elements containing gelatino-silver halide emulsion layers.

The invention will be further illustrated but is not intended to be limited by the following examples wherein all parts are by weight, all solutions aqueous and all temperatures centigrade unless otherwise indicated and all operations involving the preparation and coating of light-sensitive silver salts are carried out in the absence of light which will expose the salts:

*Example I*

A mixture of 44 parts of methyl cellulose (30% —OCH₃), 31 parts of o-hydroxybenzyl alcohol, 500 parts of dioxane, and 5 parts of 85% phosphoric acid is stirred at 80° C. for six hours poured into 1000 parts of ethanol, filtered, and washed during 40 hours with six changes of acetone, then dried to give 30 g. of a white fibrous material. This material contains the following approximate probable color unit:

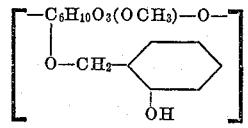

Ten parts of this polymeric dye intermediate is dissolved by stirring in 90 parts of 10% ethanol-water at 50° C. for six hours. To 40 parts of this solution is added 40 parts of water, and 5 parts of concentrated ammonia water. The mixture is stirred at 45° C. while adding 20 parts of 3N silver nitrate and 23 parts of 2.92N ammonium bromide-0.08N potassium bromide simultaneously during five minutes. After stirring a total of one-half hour at 45° C., the silver halide dispersion is allowed to cool and mixed with 200 parts of 10% sodium sulfate solution, which precipitates the binding agent containing the dispersed light-sensitive silver halide. The precipitated polymer mass is washed for one-half hour in cold running water to remove the soluble salt, then the remaining 60 parts of the original polymer solution is added, together with 25 parts of ethanol and 1 part of 10% potassium bromide, and the mixture stirred at 60° C. for one-half hour, after which it can be used directly or stored. This light-sensitive solution is coated on paper and subbed cellulose acetate film base, then exposed to a colored object and developed in the following solution:

| | Parts |
|---|---|
| p-Aminodiethylaniline hydrochloride | 2 |
| Sodium sulfite | 3 |
| Sodium carbonate | 20 |
| Water to make | 1,000 | made by dissolving the constituents in 500 parts of water and diluting the solution to 1000 parts, washed, bleached in 4% potassium ferricyanide and fixed in 25% sodium thiosulfate solution. The resulting film and paper contains a strong blue-green negative dye image.

*Example II*

A solution of 51 parts of 2-phenyl-4-chlorophenol, 50 parts of 20% sodium hydroxide, and 25 parts of 37% formaldehyde solution is kept at 55° C. for 24 hours, then added to a solution of 44 parts of sodium cellulose glycolate (containing approximately one —CH₂COONa per glucose unit) in 400 parts of water and 50 parts of 20% sodium hydroxide. This mixture is stirred at 60° C. for six hours, then precipitated by addition of 2000 parts of acetone and washed with acetone (8 changes of 1000 parts each during 40 hours), filtered, and dried to give 56 parts of a white powder. A solution is prepared by stirring 10 parts of this mixed glycolic acid ether-2-hydroxy-3-phenyl-5-chlorobenzyl ether of cellulose in 90 parts of 10% ethanol at 50° C. for six hours. To 40 parts of this solution is added 40 parts of water, 25 parts of 2.82N ammonium bromide-0.08N potassium iodide, as in Example I. The mixture is stirred at 45° C. while adding 10 parts of ammoniacal 3N silver nitrate. Then, after stirring 15 minutes at 45° C., 10 parts of 3N silver nitrate is added and the mixture stirred at 45° C. for 15 minutes. The dispersion is cooled to 30° C. and precipitated by adding 100 parts of 20% sodium sulfate solution. The precipitated light-sensitive composition is washed for one hour in cold distilled water; then the remaining 60 parts of polymer solution is added together with 20 parts of ethanol and 1 part of 10% potassium bromide, and the whole mixture stirred at 60° C. for one-half hour. The product is then coated on a subbed cellulose acetate film base and processed as in Example I to yield similar results.

*Example III*

Fifty-one parts of 2-phenyl-4-chlorophenol, 50 parts of 20% sodium hydroxide, 25 parts of 37% formaldehyde solution is warmed to dissolve and kept at 55° C. for 24 hours. To this solution is added 15 parts of concentrated sulfuric acid and sufficient ice to cool to 20° C. The mixture is then extracted with ether, the ether solution washed and dried with anhydrous magnesium sulfate, and evaporated. The light yellow oil so obtained is added to a mixture of 44 parts of methyl cellulose (containing approximately 30% —OCH₃) in 500 parts of dioxane, and stirred at 75° for eight hours. After cooling to room temperature, 1000 parts of acetone is added, the product filtered and washed with acetone (six changes of 1000 parts each during 40 hours) filtered and dried to give 37 parts of a white, fluffy, fibrous material. This material, the mixed cellulose methyl/2-chloro-3-phenyl-5-chlorobenzyl ether, is used in preparing a light-sensitive coating as in Example II, and coated as in Example I. The resulting films and paper, after processing, contain brilliant blue-green negative dye images.

*Example IV*

A mixture of 25 parts of methyl cellulose (approximately 28% —OCH₃), 25 parts of phenylmethylpyrazolone, and 200 parts of glacial acetic acid is stirred at 80° C. for one-half hour. Then 5 parts of paraformaldehyde and 3 parts of 85% phosphoric acid is added and stirring at 80° C. continued for two hours. The product is precipitated by adding 500 parts of acetone, extracted with acetone for six hours, and dried to give 20 parts of a white solid. This mixed methyl/1-phenyl-3-methyl-5-keto pyrazyl ether of cellulose is soluble in hot, 30% methanol and when used in place of the color-forming polymer of Example I, yields films and paper containing brilliant magenta negative dye images.

*Example V*

A mixture of 25 parts of methyl cellulose (approximately 18% —OCH₃), 5 parts of paraformaldehyde, 200 parts of glacial acetic acid, and 3 parts of 85% phosphoric acid is stirred at 75° for one hour; then 20 parts of o-chloroacetoacetanilide is added and stirring at 75° continued for two hours. After cooling to room temperature, the product is precipitated by the addition of 500 parts of acetone. The color-forming polymer is then extracted with acetone for six hours and dried to give 20 parts of a white solid soluble in hot 30% ethanol. This material which has a color unit structure represented by the following approximate formula:

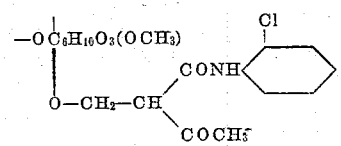

when used in place of the polymeric color-former of Example I yields, after processing, films and paper containing brilliant yellow negative dye images.

*Example VI*

A mixture of 50 parts of sodium N-phenylacetoacetanilide in 135 parts of dioxane is stirred while adding 25 parts of methyl chloromethyl ether during one hour, then diluted with 500 parts of water and extracted twice with ether. The ether solution is dried, filtered, and evaporated to about 25 parts, then dissolved in 50 parts of dioxane. This dioxane solution is added to a mixture of 20 parts of hydroxyethyl cellulose of approximately 22% hydroxyethyl content, 1 part of 85% phosphoric acid, and 150 parts of dioxane. The mixture is heated three hours at 75–80° C., precipitated with 500 parts of acetone, washed with acetone, and extracted for six hours. This material, having a color-former unit which may be represented by the following approximate formula:

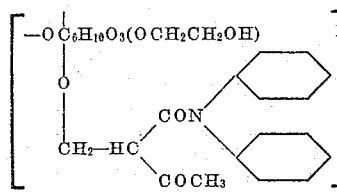

is used in place of the polymeric color-former of Example II to produce a film containing a yellow negative dye image.

*Example VII*

One hundred parts of a fast gelatin-silver iodobromide emulsion is melted at 40° and diluted with 300 parts of distilled water. This diluted emulsion is spun in a centrifuge until the silver halide has separated from the aqueous gelatin solution. After washing with warm water, 10 part of this moist silver halide is dispersed in a solution of 10 parts of the polymeric color-former of Example I dissolved in 150 parts of 20% ethanol-water. The resulting fast light-sensitive color-forming dispersion is coated on a subbed cellulose nitrate base exposed to an object and processed as in Example I to yield a negative blue-green dye image.

*Example VIII*

The light-sensitive coated films of the above examples are exposed and developed in a non-color-coupling photographic developer of the following compositiion:

| | Parts |
|---|---|
| Water | 975 |
| p-N-methylaminophenol sulfate | 2.5 |
| Sodium sulfite (anhydrous) | 75.0 |
| Hydroquinone | 3.0 |
| Sodium carbonate (anhydrous) | 30.0 |
| Potassium bromide | 2.0 | washed, re-exposed or chemically fogged, then treated as in the film in Example I, whereupon positive color images of the same color are obtained.

*Example IX*

A monopack suitable for natural color reproduction is prepared by coating on a cellulose acetate film base the following composition: The light-sensitive material of Example I which has been sensitized to the red region of the spectrum but not the green by a green-blind red sensitizer, e. g., N,N'-diethyl naphthiocarbocyanine iodide. Over this is coated the light-sensitive composition of Example IV which has been sensitized to the green region with a sensitizing dye, e. g., erythrosin. Over this last mentioned layer is coated a layer of cellulose acetate of 40% acetate content containing a removable yellow filter dye to absorb blue light, e. g., tartrazine CI-640. Above this yellow filter layer is coated the blue-sensitive composition of Example V. This film element is exposed to a colored object scene whereby latent images representing different color component aspects in the different layers are found as is known in the art. The film is then processed by the following steps:

1. Develop ten minutes in the non-color-forming developer of Example VIII.
2. Wash ten minutes.
3. Re-expose to white light and reduce the residual silver salt by treatment for fifteen minutes in the dye generating developer of of Example I.
4. Wash ten minutes.
5. Bleach seven minutes in a solution containing 3.5% potassium ferricyanide and made alkaline with ammonium hydroxide or sodium carbonate.
6. Rinse.
7. Remove bleached silver in a 25% solution of hypo (crystalline sodium thiosulfate).
8. Wash fifteen minutes and dry.

The colored photograph resulting from the above process is of exceptional clarity and brilliance. The definition is considerably greater than that obtained by use of previously known films.

*Example X*

A cellulose nitrate base is coated with the light-sensitive coating of Example III which has been sensitized to red light but not green by means of a green-blind sensitizing dye, e. g., pinacyanol. After drying, a layer of cellulose acetate of 40% acetate content is coated on top of the emulsion, then dried, and the light-sensitive composition of Example IV which has been orthochromatized is coated and dried. Next is coated a non-color-forming layer as above containing a yellow (minus blue) filtering material, e. g., titanium ferrocyanide or N-octadecyl alpha-(4-piperonylbutadienyl)-pyridinium bromide (U. S. P. 2,255,077). Over this is coated the light-sensitive composition of Example VI. The resulting film is exposed to a colored object and treated by the development method of Example I to form a color negative in which all of the colors of the object scene are reproduced in their complementary color. This color negative is then printed onto an unexposed film of the same material using successive exposures of blue, green, and red light which are substantially complementary to the colors of the dyes generated in the layers and, after processing by the method of Example I, a color positive is obtained.

*Example XI*

A film prepared according to Example I is exposed and developed in the developer of Example I. After development, the film is washed and placed in a diazo solution prepared as follows: 1.73 parts of 2-chloro-4-nitroaniline dissolved in 5 parts of concentrated sulfuric acid is mixed with 0.7 part of sodium nitrite dissolved in 5 parts of concentrated sulfuric acid and, after thoroughly mixing, the solution is poured with rapid stirring into a mixture of 600 parts of water and 400 parts of ice. Following this, 15 parts of sodium acetate and 7 parts of calcium hydroxide are added and the solution filtered at 0.5°. After two minutes in this solution, the film is placed in 1 molar hydrochloric acid at 5° for 5 minutes to wash out the excess of diazonium compound. The silver and developer coupling products are bleached by immersion for 10 minuates at 15° in an aqueous solution containing 10% copper sulfate, 5% potassium bromide, and 5% concentrated hydrochloric acid. After washing, the film is fixed in a standard potassium alum-thiosulfate bath, washed, and dried to give a film containing a positive image in a brilliant yellow azo dye.

*Example XII*

A film prepared according to Example III is exposed to an object, developed in the non-color-forming developer of Example VIII, washed and dried. After re-exposure to white light, the film is developed in a solution containing 96 parts of water, 5 parts of 2% sodium oleate, 2 parts of phenylhydrazine, and 2 parts of sodium carbonate. The developed film, after washing, is bleached in 4% potassium ferricyanide and fixed. The film then contains a brilliant yellow positive azo dye image.

*Example XIII*

A mixture of 115 parts of 1-N-beta-hydroxyethylaminonaphthalene-6-sulfonic acid, 15 parts of paraformaldehyde, and 5 parts of 85% phosphoric acid in 300 parts of dioxane and 100 parts of water is stirred for two hours at 60°; then a solution of 300 parts of cellulose acetate of 40% acetate content in 500 parts of 50% dioxane-water, is added and the mixture stirred at 75° for four hours. The mixture is diluted with 1000 parts of methanol and filtered, then washed in six changes of methanol of 200 parts each during 12 hours, filtered, and dried to give the hydroxyethylaminonaphthalene sulfonic acid ether of cellulose acetate. Ten parts of this polymer is used in the preparation of a coating by the method of Example I. The resulting element is processed by the methods of Examples XI and XII to give a brilliant positive magenta azo dye image.

*Example XIV*

A mixture of 171 parts of p-nitrobenzyl chloride and 300 parts of methyl cellulose of 28% methoxy content is stirred in 1000 parts of dioxan at 60° for one hour, then 150 parts of anhydrous potassium carbonate is added and the mixture stirred at 75° for four hours. The mixture is diluted with 1000 parts of methanol, filtered, and washed with 8 changes of 1000 parts each of 80% methanol, then filtered and dried. One hundred fifty parts of the resulting methyl cellulose containing approximately one p-nitrobenzyl group for each 4 glucose units is dissolved in 1500 parts of water and reduced with hydrogen using a platinum oxide catalyst. After freeing the solution from catalyst it is stirred at 20° with 60 parts of diketene for 12 hours; then the product, a p-aceto-acetamino benzyl ether of methyl cellulose, is precipitated by adding slowly with stirring 3000 parts of acetone. The product is washed with 1000 parts of acetone three times, then dried. Ten parts of this polymer is used in preparing a light-sensitive coating by the method of Example I. On exposure to an object and processing by the method of Example I, a negative yellow azomethine dye image is formed. On exposure and processing by methods of Examples XI and XII, a positive yellow azo dye image is formed.

In place of the specific cellulosic ethers of dye intermediates of the above examples, other such polymeric dye intermediates may be used providing that they possess the previously described physical properties. Since different color-forming groups have different effects on the solubility and permeability, it is often necessary, in order to secure the desired properties, to employ cellulose derivatives of different solubility and viscosity. If, in preparing a given dye intermediate cellulose ether, the product obtained is too soluble, a cellulose derivative having a lower water solubility but soluble in organic solvent-water mixtures or having a high viscosity can be employed. Derivatives having a lower water solubility than methyl cellulose of the above examples but soluble in water-alcohol and water-acetone solutions include methyl cellulose of higher methoxy content, ethyl cellulose having approximately one ethoxy group per glucose unit, cellulose acetates and propionates having 0.5–1.5 acyl groups per glucose unit. In general, an increase in the size or number of hydrocarbon radicals of the ester or ether groups decreases solubility in water and increases solubility in alcohols and ketones. If, on the other hand, a dye intermediate cellulose ether is obtained which is too insoluble in water or water-organic solvent solutions, there are means for obtaining a more soluble product. For instance, a more soluble methyl cellulose may be used, or hydroxyethyl cellulose and cellulose hydroxyacetate containing about one substituent per glucose unit. Cellulose derivatives containing free acid groups yield more soluble products, e. g., sodium cellulose glycolate, cellulose succinate, cellulose acid phthalate, can be used when more soluble products are desired. Of course, cellulose derivatives containing more than one of these substituents may also be employed in preparation of the polymeric color-formers, and in certain cases these groups can be introduced subsequent to introduction of the color-forming group in order to modify the film-forming properties.

The preferred reaction for preparing these new color-forming binding agents involves ether formation through formaldehyde.

The color-forming nuclei need not, however, be attached directly to the methylene ether group. Non-color-forming formaldehyde reactive groups, e. g., amide, mercapto, or aliphatic amino or hydroxyl, may be present in the dye former and react with the formaldehyde to form methylol derivatives capable of condensing with the hydroxyl groups of the polymer to form ethers.

Alternatively, other etherification methods may be employed. In all of these compounds a bifunctional non-color-coupling radical may intervene between the ether methylene groups and the color-coupling nuclei. Thus by methods useful in making simple aliphatic ethers, the dye intermediate or color-forming nuclei can be joined to the polymer chain through other ether groups such as —OCH₂COQ, —OCHRQ, —OCH₂CH₂Q, —OCR₂Q, OCH₂C₆H₄Q, —OCH₂OCH₂COQ, —OCH₂OCH₂Q, —OCH₂CH₂NHQ, —OCH₂CH₂SQ, —OCH₂CHOHCH₂—, —OQ, —CH₂CHOHCH₂NHQ, etc., wherein the R groups are small alkyl radicals and Q is a group containing a color forming nucleus by the following representative methods: (1) The cellulosic material is stirred or milled with 10—20% aqueous sodium hydroxide and a color-former containing an aliphatic chloride, bromide or iodide group is added and the mixture stirred and warmed to split out hydrogen halide from the reactants, thus connecting the color-forming nuclei to the polymer chain through an ether linkage, (2) a partial glycolic acid ether is formed by reaction of the hydrophilic polymer with chloroacetic acid and sodium hydroxide after which the carboxylic acid groups are converted to amides by reaction with color-forming compounds containing amino groups or (3) by reduction of nitrobenzyl ethers of the cellulose derivative followed by reaction with color-former acid chlorides.

In addition to the dye intermediate groups of the above examples, many of the other well known color-coupling components may be employed. Thus, the dye intermediate nucleus may be any phenol, naphthol, or aromatic amine having a coupling position available ortho or para to the aromatic hydroxyl group or amine group, or any active methylene group, i. e., a compound having a —CH₂— group activated by two unsaturated groups taken from the class of

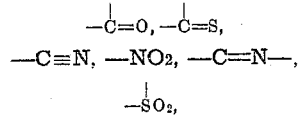

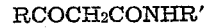

—CONH—, —COOalkyl, —COOaryl connected either directly or through a conjugated system. Such active methylene compounds are distinguished by their ability to enolize in alkaline solution forming a soluble alkali metal salt and include many acyclic and heterocyclic compounds known in the art. Examples of such active acyclic and intracyclic methylene compounds include (1) beta-ketoacylamides of the type

RCOCH₂CONHR' where R is a hydrocarbon or heterocyclic radical and R' is preferably aromatic, e. g., benzoylacetanilide, p-nitrobenzoylacetanilide, p-nitroacetoacetanilide, naphoylacetanilide, p - acetoacetaminobenzoic acid, furoylacetanilide, (2) pyrazolones, e. g., 1-phenyl-3-methyl-5-pyrazolone, 1-p - chlorophenyl - 3-methyl-5-pyrazolone, 1-5-phenyl-3-carboxy-5-pyrazolone, 1 - m - sulfophenyl-3-methyl-5-pyrazolone, (3) indoxyl and thioindoxyl, (4) N-homophthalylamines, e. g., N-homophthalylaniline, N-homophthalyl-n- dodecylamine, N-homophthalyl - beta - naphthylamine, (5) 2,4-dihydroxyquinoline, (6) p-nitrobenzylcyanide, (7) diketohydrindene, (8) malonamides, e. g., ethyl-N-phenylmalonamate, N,N'-diphenylmalonamide, (9) phenacylpyridinium bromide, (10) hydroxypyridine, (11) cyanoacetanilide, cyanoacetic ethyl ester.

In the method of preparing these polymeric color-forming binding agents employing formaldehyde to connect the color-former to the cellulose derivative, the formaldehyde may be in any form. Thus, it can be used as solid paraformaldehyde or dissolved or suspended in water or solvents for the color-former, or as formaldehyde releasing compounds such as trioxane, hexamethylenetetramine, or compounds capable of forming methylol derivatives, methylene diacetate, methyl chloromethyl ether, etc. Alternatively, dimethylol derivatives, amides, ureas, etc., e. g., dimethylolurea, dimethyloladipamide, dimethyloloxamide, and their ethers, such as bismethoxymethylurea, may be used in place of formaldehyde for linking the dye intermediates to the polymer chain.

The color-yielding elements of this invention are not limited in their utility to any one process of color photography. They may be used with other color-coupling developing agents than those specifically described in the examples. The diamine aryl compounds such as para-phenylenediamine and its substitution products are preferred. These developers may be substituted in the amino groups as well as in the ring, preferably the former, to constitute compounds such as the mono- and di-alkyl arylenediamines, including the mono- and di-alkyl naphthylenediamines, alkyl phenylenediamines and alkyl toluylenediamines. The compounds, of course, must have one free primary or unsubstitued amino group which enables the oxidation product of the developer to couple with the color-forming compounds. As examples of developers of the class described, there may be mentioned p-amino- diethylaniline, 1,4-naphthylenediamine, 4-diethylamino-1-naphthylamine. The salts of the bases which may be organic or inorganic are, in general, more soluble and more stable than the free bases. The hydrochlorides and sulfates have great utility in preparing the developing solutions.

Multilayer films other than those described in the above examples may be prepared using the novel ethers of this invention. In a modified three-color photographic element the layer for recording red light and producing the blue-green part image may be sensitized to green and red light both and protected by a green-absorbing red filter layer between it and the exposure, or the sensitive layers may be coated in a different order, or one of these layers may be on the other side of the support. In addition, the color-coupling light-sensitive compositions hereof can be applied to a two-color process by suitable selection of dye intermediate nuclei and sensitizing compounds. Further, the invention can be combined with other processes for producing colored photographic images.

An important advantage of the new film elements of this invention resides in the increased stability of the dye images formed. Another important advantage resides in the toughness of the light-sensitive layers. They are far superior to gelatin in this respect. Thus, a gelatin coated film when bent sharply between the thumb and forefinger with the gelatin side out, breaks in two. The elements hereof, on the other hand, can be folded repeatedly without breaking or cracking of the layer.

A further advantage resides in the fact that the color-yielding layers produce the maximum color density obtainable from the amount of silver salt reduced by the color-coupling developer. This admits of the saving of silver halides. The lower amount of silver halides is of major importance in multilayer films because the innermost layers receive light passing through layers intervening the source of light. The less silver halide the upper layers contain, the less scattering of light there is and the more light passes through to the lower layers. This results in films having a higher overall sensitivity and a higher degree of definition and resolution than is obtainable by the use of immobile color-formers in gelatin layers.

Another important advantage lies in the fact that thinner coatings can be used. The layers are tougher than gelatin and have a higher concentration of silver salts than gelatin. Moreover, they are uniform and their sensitivity can be accurately controlled by adding carefully measured amounts of sensitizing agents. In addition, the light-sensitive color-yielding coating compositions hereof are more stable than gelatin emulsions, are resistant to bacterial putrefaction, and can be stored longer.

The products of this invention have a wide utility in color photography. Not only may they be utilized as a direct taking stock in the color development process as described in the above examples, but they are useful in duplicating or copying and making color prints on paper. Thus, the multilayer film of Example IX may be processed as in Example I to a color negative, then printed onto a similar film with white light or by exposure with blue, green, and red light controlled by suitable filters adjusted to the spectral qualities of the dyes and color sensitizers, and the printed material again processed as in Example I to a color positive. Thus, any number of color positives may be produced from a single color negative. Similarly, by using the procedure of Example IX on both the taking and printing stocks, color positives can be produced by reversal. In this way also, any number of color prints can be produced. The color negatives or positives produced according to this invention can also be employed in securing separation negatives or positives by known processes of color separation. The multilayer films usch as described in Examples IX and X can also be used as printing media by printing with suitable colored light from separation negatives or positives and proper processing as described above to yield color positives.

The new film elements prepared according to this invention have broad utility in azo dye processing, providing that the proper azo dye coupling nuclei are attached to the polymer chain. In U. S. P. 2,297,732 and application Serial No. 450,403, filed July 10, 1942, now U. S. Patent No. 2,342,620 of February 22, 1944, is described a method for producing azo dye images involving color development and azo dye coupling steps. When the dye coupling nuclei of that invention are attached to the cellulosic polymers to prepare products of the present invention, the film elements prepared from them may be processed to pictures containing azo dye images of exceptionally good quality, stability, and clarity by the method described in the above mentioned patent. They are also useful in other azo processes. Thus, they may be employed with the hydrazine developers of U. S. Patent 2,220,929 and in the process of U. S. Patent 2,339,213, whereby azo dyes are produced on color development with aromatic hydrazine reducing agents. In addition, these elements are useful in the known processes involving conversion of silver salt images to silver anti-diazotate images followed by coupling to form azo dye images.

A film element of this latter type is also useful in the catalytic bleach process employing silver or silver salt images. Thus, the film after exposure and processing employing non-coupling developers to a film containing silver or silver salt images may be treated with a suitable diazonium compound to uniformly dye the layers in their appropriate colors. By use of the known catalytic bleach methods, this film may then be processed to a color negative or positive, as desired.

As many apparently widely different embodiments of this invention may be made without departing from the spirit and scope thereof, it is to be understood that the invention is not limited to the specific embodiments thereof except as defined in the appended claims.

What is claimed is:

1. A color-yielding element comprising a support bearing at least one layer composed of a hydrophilic dye intermediate ether of a hydrophilic cellulose derivative having a light-sensitive silver salt dispersed therethrough, said ether being capable of reacting with a diazo compound to form an azo dye.

2. A color-yielding element comprising a support bearing at least one layer composed of a hydrophilic dye intermediate ether of a hydrophilic cellulose derivative having light-sensitive silver salts dispersed therethrough, said ether having a plurality of dye intermediate nuclei, each being connected through aliphatic ether linkages to a carbon atom in the chain of atoms of said cellulose derivative, said nuclei posessing a structure of the formula:

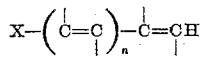

where X is a member of the group consisting of HO— and primary and secondary amino radicals and $n$ is a number from the group consisting of 0 and 1.

3. A color-yielding element comprising a support bearing at least one layer composed of a hydrophilic dye intermediate ether of a cellulose derivative of the general formula:

wherein $x$ is 0.5 to 1.5, $y$ is 0.03 to 1.0 and the total of $x$ and $y$ is not more than 2; R is taken from the group consisting of alkyl radicals of 1 to 3 carbon atoms and carboxylic alkyl radicals of 2 to 3 carbon atoms; Q is a die intermediate nucleus possessing a structure of the formula:

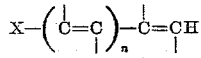

where X is a member of the group consisting of HO— and primary and secondary amino radicals and $n$ is a number from the group consisting of 0 and 1, said layer having light-sensitive silver halides dispersed therethrough.

4. A color-yielding photographic element comprising a support bearing at least one layer composed of a hydrophilic methyl cellulose dye intermediate ether containing recurring structural units of the formula

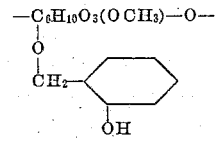

said layer having light-sensitive silver halides dispersed therethrough.

5. A color-yielding photographic element comprising a support bearing at least one layer composed of a hydrophilic-mixed methyl/1-phenyl-3-methyl-5-ketopyrazyl ether of cellulose, said layer having light-sensitive silver halides dispersed therethrough.

6. A color-yielding photographic element comprising a support bearing at least one layer composed of a hydrophilic methyl cellulose dye intermediate ether containing recurring structural units of the formula

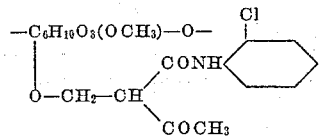

said layer having light-sensitive silver halides dispersed therethrough.

DAVID W. WOODWARD.

REFERENCES CITED

The following references are of record in the file of this patent:

UNITED STATES PATENTS

| Number | Name | Date |
|---|---|---|
| 2,186,849 | Wilmanns et al. | Jan. 9, 1940 |
| 2,186,733 | Schneider et al. | Jan. 9, 1940 |
| 2,297,732 | Woodward | Oct. 6, 1942 |
| 2,306,410 | Schinzel | Dec. 29, 1942 |
| 2,320,422 | Frohlich | June 1, 1943 |
| 2,282,001 | Russell et al. | May 5, 1942 |
| 2,292,575 | Loleit | Aug. 11, 1942 |
| 2,310,943 | Dorough et al. | Feb. 16, 1943 |
| 2,330,291 | Kirby | Sept. 28, 1943 |
| 2,186,732 | Schneider et al. | Jan. 9, 1940 |
| 2,297,732 | Woodward | Oct. 6, 1942 |

FOREIGN PATENTS

| Number | Country | Date |
|---|---|---|
| 537,256 | British | June 16, 1941 |
| 540,368 | British | 1941 |